United States Patent
Lin et al.

(10) Patent No.: US 11,513,012 B2
(45) Date of Patent: Nov. 29, 2022

(54) AGING CALIBRATION FOR TEMPERATURE SENSOR

(71) Applicant: MEDIATEK INC., Hsinchu (TW)

(72) Inventors: Ta-Hsin Lin, Hsinchu (TW); Jyun-Jia Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 393 days.

(21) Appl. No.: 16/867,897

(22) Filed: May 6, 2020

(65) Prior Publication Data

US 2020/0386629 A1 Dec. 10, 2020

Related U.S. Application Data

(60) Provisional application No. 62/860,299, filed on Jun. 12, 2019, provisional application No. 62/857,932, filed on Jun. 6, 2019.

(51) Int. Cl.
*G01K 15/00* (2006.01)
*G01K 7/00* (2006.01)

(52) U.S. Cl.
CPC ............. *G01K 15/005* (2013.01); *G01K 7/00* (2013.01)

(58) Field of Classification Search
CPC ........ G01K 15/005; G01K 15/00; G01K 7/00; G01K 7/01; G01K 1/20; G01K 2217/00; G01K 2219/00; G01K 7/346
(Continued)

(56) References Cited

U.S. PATENT DOCUMENTS 7,225,099 B1 5/2007 O'Dwyer
7,372,338 B2 * 5/2008 Tseng ................. H03L 1/00
                                                    331/1 R
(Continued)

FOREIGN PATENT DOCUMENTS

AU    2006261592 A1 *  1/2008  ............... G01D 3/02
CN    101782439 A      7/2010
(Continued)

OTHER PUBLICATIONS

European Search Report dated Oct. 19, 2020, issued in application No. EP 20177616.8.
(Continued)

*Primary Examiner* — Gail Kaplan Verbitsky
(74) *Attorney, Agent, or Firm* — McClure, Qualey & Rodack, LLP

(57) ABSTRACT

A thermal sensor with non-ideal coefficient elimination is shown. The thermal sensor has a bandgap circuit, a dual-phase voltage-to-frequency converter, and a frequency meter. The bandgap circuit outputs a temperature-dependent voltage. The dual-phase voltage-to-frequency converter is coupled to the bandgap circuit in the normal phase to perform a voltage-to-frequency conversion based on the temperature-dependent voltage, and is disconnected from the bandgap circuit in the coefficient capturing phase to perform the voltage-to-frequency conversion based on the supply voltage. The frequency meter is coupled to the dual-phase voltage-to-frequency converter to calculate the temperature-dependent frequency corresponding to the normal phase of the dual-phase voltage-to-frequency converter. The frequency meter also calculates the temperature-independent frequency corresponding to the coefficient capturing phase of the dual-phase voltage-to-frequency converter. The temperature-dependent frequency and the temperature-
(Continued)

independent frequency are provided for temperature evaluation with non-ideal coefficient elimination.

16 Claims, 3 Drawing Sheets

(58) Field of Classification Search
USPC .......................................................... 702/99
See application file for complete search history.

(56) References Cited

U.S. PATENT DOCUMENTS

| | | | |
|---|---|---|---|
| 8,136,987 B2 | 3/2012 | Luria et al. | |
| 8,274,300 B2 | 9/2012 | Sakaue et al. | |
| 8,419,274 B2 | 4/2013 | Chen et al. | |
| 8,434,351 B2 | 5/2013 | Koyama | |
| 8,870,454 B2* | 10/2014 | Makinwa | H03L 1/022 |
| | | | 374/170 |
| 9,039,278 B2* | 5/2015 | Chuang | G01K 7/34 |
| | | | 374/170 |
| 9,110,104 B2 | 8/2015 | Chung et al. | |
| 9,841,325 B2 | 12/2017 | Hwang et al. | |
| 10,168,365 B2 | 1/2019 | Meltzer et al. | |
| 11,125,627 B2* | 9/2021 | Jenkner | G01K 7/01 |
| 2005/0017738 A1 | 1/2005 | Lin et al. | |
| 2007/0222528 A1* | 9/2007 | Pernia | H03L 7/089 |
| | | | 331/44 |
| 2010/0164552 A1 | 7/2010 | Luria et al. | |
| 2014/0036660 A1* | 2/2014 | Ogaki | H04L 12/12 |
| | | | 370/254 |
| 2014/0139246 A1 | 5/2014 | Chuang et al. | |
| 2014/0211905 A1 | 7/2014 | Chuang et al. | |
| 2014/0269839 A1* | 9/2014 | Tai | G01K 7/34 |
| | | | 374/184 |
| 2015/0049782 A1 | 2/2015 | Karlquist | |
| 2019/0204163 A1* | 7/2019 | Lin | H01L 23/53228 |

FOREIGN PATENT DOCUMENTS

| | | | | |
|---|---|---|---|---|
| CN | 106487331 A | * | 3/2017 | ............ H03B 5/04 |
| CN | 108731833 A | | 11/2018 | |
| CN | 109060162 A | | 12/2018 | |
| CN | 110324039 A | * | 10/2019 | ............ H03B 5/04 |
| CN | 112050960 A | * | 12/2020 | ............ G01K 15/00 |
| CN | 110940432 B | * | 8/2021 | ............ G01K 15/005 |
| EP | 1262755 A1 | * | 12/2002 | ............ G01K 15/00 |
| EP | 3748319 A1 | * | 12/2020 | ............ G01K 15/00 |
| JP | 2003004547 A | * | 1/2003 | ............ G01K 15/00 |
| TW | 200835915 A | | 9/2008 | |
| TW | 200947173 A | | 11/2009 | |
| TW | 201211560 A | | 3/2012 | |
| TW | 201443448 A | | 11/2014 | |
| TW | 201621287 A | | 6/2016 | |
| TW | 201738567 A | | 11/2017 | |
| WO | WO-9725602 A1 | * | 7/1997 | ............ G01K 15/00 |

OTHER PUBLICATIONS

Chinese language office action dated Oct. 20, 2020, issued in application No. TW 109116845.

Lin, D.S., et al.; "A 0.5V BJT-based CMOS thermal sensor in 10-nm FinFET technology;" IEEE Asian Solid-State Circuits Conference; Nov. 2017; pp. 41-44.

Chinese language office action dated Nov. 26, 2021, issued in application No. CN 202010424885.3.

* cited by examiner

AGING CALIBRATION FOR TEMPERATURE SENSOR

CROSS REFERENCE TO RELATED APPLICATIONS

This Application claims the benefit of U.S. Provisional Applications No. 62/857,932 filed on Jun. 6, 2019 and No. 62/860,299 filed on Jun. 12, 2019, the entirety of which are incorporated by reference herein.

BACKGROUND OF THE INVENTION

Field of the Invention

The present invention relates to a chip with a thermal sensor design.

Description of the Related Art

In electronic devices, e.g., modern mobile devices using a fast application processor (AP), the highest operating speed is generally limited by thermal issues. Hence accurate temperature sensing is essential for maximizing the operating speed of an electronic device. Typically, a thermal sensor is placed in a chip. Aging of the resistors and capacitors of the thermal sensor may deteriorate the accuracy of temperature sensing. Or, packaging stress may also change the resistors and capacitors used in the thermal sensor and thereby affect the temperature sensing.

Calibration for a thermal sensor is required.

BRIEF SUMMARY OF THE INVENTION

One of the objectives of the claimed invention is to provide a thermal sensor calibration technique.

A thermal sensor in accordance with an exemplary embodiment of the present invention has a bandgap circuit, a dual-phase voltage-to-frequency converter, and a frequency meter. The bandgap circuit outputs a temperature-dependent voltage. The dual-phase voltage-to-frequency converter is coupled to the bandgap circuit in the normal phase to perform a voltage-to-frequency conversion based on the temperature-dependent voltage. The dual-phase voltage-to-frequency converter is disconnected from the bandgap circuit in the coefficient capturing phase to perform the voltage-to-frequency conversion based on the supply voltage. The frequency meter is coupled to the dual-phase voltage-to-frequency converter to calculate a temperature-dependent frequency corresponding to the normal phase of the dual-phase voltage-to-frequency converter and a temperature-independent frequency corresponding to the coefficient capturing phase of the dual-phase voltage-to-frequency converter. The temperature-dependent frequency and the temperature-independent frequency are provided for temperature evaluation with non-ideal coefficient elimination.

In an exemplary embodiment, the thermal sensor further has a charge pump circuit pumping the supply voltage to a higher level for operations of the bandgap circuit. The bandgap circuit further generates a temperature-independent reference voltage to be coupled to the dual-phase voltage-to-frequency converter with the temperature-dependent voltage.

In an exemplary embodiment, the dual-phase voltage-to-frequency converter comprises a switched-capacitor integrator loop. In the normal phase, the temperature-dependent voltage and the temperature-independent reference voltage are coupled to the switched-capacitor integrator loop and the switched-capacitor integrator loop generates an oscillation signal oscillating at the temperature-dependent frequency. In the coefficient capturing phase, a first direct-current voltage and a second direct-current voltage derived from the supply voltage are coupled to the switched-capacitor integrator loop and thereby the oscillation signal generated by the switched-capacitor integrator loop oscillates at the temperature-independent frequency.

In an exemplary embodiment, the switched-capacitor integrator loop has an integrator, a switched-capacitor resistor coupled to the integrator through an input terminal of the integrator, a voltage controlled oscillator, and a divider. The switched-capacitor resistor receives the temperature-dependent voltage when the temperature-independent reference voltage is coupled to a reference terminal of the integrator, and receives the first direct-current voltage when the second direct-current voltage is coupled to the reference terminal of the integrator. The voltage controlled oscillator generates the oscillation signal according to an output voltage of the integrator. The divider operates the switched-capacitor resistor to mimic a resistor based on the oscillation signal.

In an exemplary embodiment, the switched-capacitor resistor has a first switch and a second switch controlled by an output signal and an inversed output signal of the divider, respectively, and a capacitor. The capacitor has a first terminal for receiving the temperature-dependent voltage or the first direct-current voltage and a second terminal coupled to the input terminal of the integrator through the second switch. The first switch is coupled between the first terminal and the second terminal of the capacitor.

The temperature-dependent frequency and the temperature-independent frequency may both involve information about the capacitor of the switched-capacitor resistor that is affected by the aging effect or packaging stress. By combining the temperature-dependent frequency and the temperature-independent frequency, non-ideal coefficients due to the capacitor of the switched-capacitor resistor are eliminated and temperature data for evaluation of a temperature value is evaluated.

In another exemplary embodiment, a chip comprising the aforementioned thermal sensor and a processor is shown. The processor evaluates temperature data based on a temperature-dependent period derived from the temperature-dependent frequency and a temperature-independent period derived from the temperature-independent frequency, and evaluates a temperature value based on the temperature data. When evaluating the temperature data, the processor eliminates non-ideal coefficients of the temperature-dependent period by the temperature-independent period.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
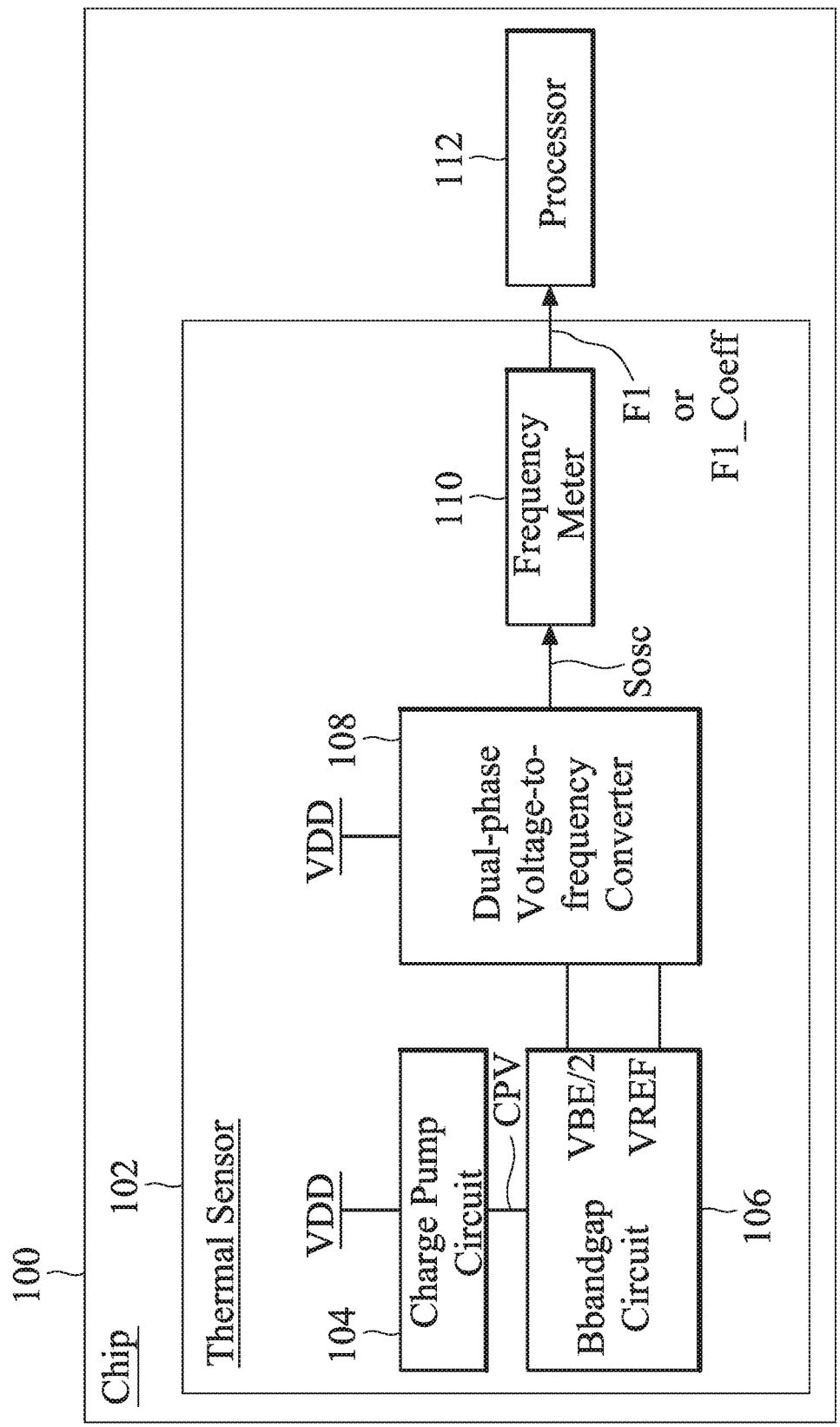
FIG. 1 depicts a chip 100 with a thermal sensor 102 in accordance with an exemplary embodiment of the present invention.

FIG. 1 depicts a chip 100 with a thermal sensor 102 in accordance with an exemplary embodiment of the present invention.

Instead of using a resistor or an ETF (electrothermal filter), the thermal sensor 102 is in a transistor-based design, which is more robust for mass production and its temperature coefficient model is more accurate in the design phase. The thermal sensor 102 has a charge pump circuit 104, a bandgap circuit 106, a dual-phase voltage-to-frequency converter 108, and a frequency meter 110. A supply voltage VDD (e.g., around 0.5V, like 0.568V) is pumped to a higher level CPV (e.g., around 1.2V) for operations of the bandgap circuit 106 and thereby provides a greater headroom for the bandgap circuit 106.

The bandgap circuit 106 includes transistors whose junction forward-bias voltage VBE varies with the junction temperature. The bandgap circuit 106 outputs a temperature-independent reference voltage VREF as well as a temperature-dependent voltage VBE/2. In the normal phase, the dual-phase voltage-to-frequency converter 108 performs a voltage-to-frequency conversion based on the temperature-dependent voltage VBE/2 and the temperature-independent reference voltage VREF. An oscillation signal Sosc oscillating at a temperature-dependent frequency F1 is generated.

In addition to the normal phase, a coefficient capturing phase is specifically provided in the present invention. In the coefficient capturing phase, the dual-phase voltage-to-frequency converter 108 is disconnected from the bandgap circuit 106. Instead, the dual-phase voltage-to-frequency converter 108 performs the voltage-to-frequency conversion based on the supply voltage (e.g., VDD and VDD/2). The generated oscillation signal Sosc is changed to oscillate at a temperature-independent frequency F1_Coeff. The temperature-independent frequency F1_Coeff is used in non-ideal coefficient elimination.

The temperature-dependent frequency F1 and the temperature-independent frequency F1_Coeff are calculated by the frequency meter 110. The frequency meter 110 may be a digital back-end of the transistor-based thermal sensor 102, and is coupled to a processor 112 of the chip 100. The processor 112 may derive a temperature-dependent period Period_1 from the temperature-dependent frequency F1, and a temperature-independent period Period_2 from the temperature-independent frequency F1_Coeff. The non-ideal coefficients of the temperature-dependent period Period_1 are presented in the temperature-independent period Period_2. The non-ideal coefficients of the temperature-dependent period Period_1 may be eliminated by dividing the temperature-dependent period Period_1 by the temperature-independent period Period_2.

In an exemplary embodiment, the processor 112 evaluates temperature data x based on the temperature-dependent period Period_1 and the temperature-independent period Period_2, and then evaluates a temperature value T based on the temperature data x. Because the non-ideal coefficients of the temperature-dependent period Period_1 may be eliminated by the temperature-independent period Period_2 (e.g., by dividing Period_1 by Period_1) during the evaluation of the temperature data x, the temperature value T evaluated from the temperature data x is reliable. The degradation of electronic components within the thermal sensor 102 (e.g., due to the aging effect or packaging stress does not affect the accuracy of the thermal sensor 102. According to the high-accuracy temperature value T, the processor 112 can effectively optimize the operations of the chip 100 (e.g., dynamic clock adjusting). The chip 100 with such a robust thermal sensor 102 works well in automobile electronics, which guarantees the long service life of automobile electronics.

Figure 2:
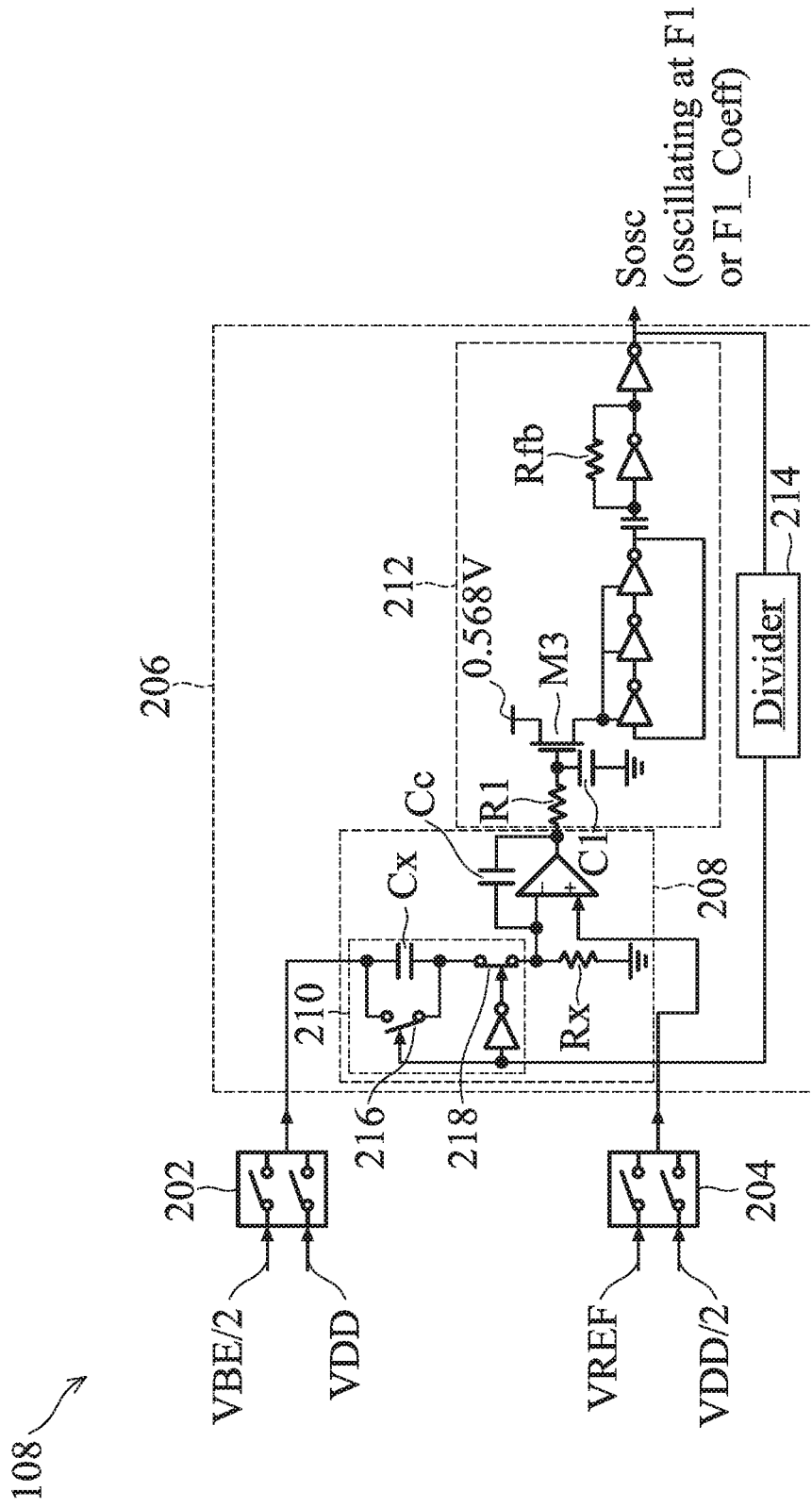
FIG. 2 depicts the details of the dual-phase voltage-to-frequency converter 108 in accordance with an exemplary embodiment of the present invention.

FIG. 2 depicts the details of the dual-phase voltage-to-frequency converter 108 in accordance with an exemplary embodiment of the present invention. The dual-phase voltage-to-frequency converter 108 includes two selection circuits 202 and 204 and a switched-capacitor integrator loop 206. In the normal phase, the selection circuits 202 and 204 pass the temperature-dependent voltage VBE/2 and the temperature-independent reference voltage VREF to the switched-capacitor integrator loop 206 and the switched-capacitor integrator loop 206 generates the oscillation signal Sosc oscillating at the temperature-dependent frequency F1. In the coefficient capturing phase, the selection circuits 202 and 204 pass direct-current voltages VDD and VDD/2 to the switched-capacitor integrator loop 206 and thereby the oscillation signal Sosc generated by the switched-capacitor integrator loop 206 oscillates at the temperature-independent frequency F1_Coeff.

The switched-capacitor integrator loop 206 comprises an integrator 208 (including a switched-capacitor resistor 210), a voltage controlled oscillator (VCO) 212 and a divider 214. The switched-capacitor resistor 210 is coupled to the integrator 208 through an input terminal of the integrator 208. The switched-capacitor resistor 210 receives the temperature-dependent voltage VBE/2 when the temperature-independent reference voltage VREF is coupled to a reference terminal of the integrator 208, and receives the direct-current voltage VDD when the direct-current voltage VDD/2 is coupled to the reference terminal of the integrator 208. The voltage controlled oscillator 212 generates the oscillation signal Sosc according to an output voltage of the integrator 208. The switched-capacitor resistor 210 mimics a resistor based on the oscillation signal after divider 214.

As shown, the switched-capacitor resistor 210 has two switches 216 and 218 and a capacitor Cx. The switches 216 and 218 are controlled by an output signal and an inversed output signal of the divider 214, respectively. The capacitor Cx has a first terminal for receiving the temperature-dependent voltage VBE/2 or the direct-current voltage VDD and a second terminal coupled to the input terminal of the integrator 208 through the second switch 218. The switch 216 is coupled between the first terminal and the second terminal of the capacitor Cx.

According to the circuit design of FIG. 2, the temperature-dependent frequency F1 and the temperature-independent frequency F1_Coeff both involve information about the capacitor Cx of the switched-capacitor resistor 210 that might be affected by the aging effect or packaging stress. By combining the temperature-dependent frequency F1 and the temperature-independent frequency F1_Coeff (e.g., dividing Period_1 by Period_2), non-ideal coefficients due to the capacitor Cx of the switched-capacitor resistor 210 are eliminated. Temperature data x without non-ideal coefficients are evaluated. Thus, high-accuracy temperature value T is evaluated.

In the normal phase, the temperature-dependent frequency F1 corresponds to the temperature-dependent period Period_1, Rx·Cx(VBE/2VREF−1). There may be non-ideal variations on the capacitor Cx due to the aging effect or packaging stress. To capture the present values of the capacitor Cx, the dual-phase voltage-to-frequency converter 108 is switched to the coefficient capturing phase.

In the coefficient capturing phase, the temperature-independent frequency F1_Coeff corresponds to the temperature-independent period Period_2, Rx·Cx. The temperature-independent period Period_2 carries the information about the present values of the capacitor Cx.

The temperature-dependent frequency F1 and the temperature-independent frequency F1_Coeff calculated by the frequency meter 110 and transmitted to the processor 112 may be converted to Period_1 and Period_2 by the processor 112. The processor 112 may further evaluate the temperature data x by the following calculation:

$$x = \frac{Period\_1}{Rx\_cali \cdot Cx\_cali \cdot \left(\frac{VBE\_cali}{2VREF\_cali} - 1\right)} \cdot \frac{Rx\_cali \cdot Cx\_cali}{Period\_2} =$$

$$\frac{Rx \cdot Cx \cdot \left(\frac{VBE}{2VREF} - 1\right)}{Rx\_cali \cdot Cx\_cali \cdot \left(\frac{VBE\_cali}{2VREF\_cali} - 1\right)} \cdot \frac{Rx\_cali \cdot Cx\_cali}{Rx \cdot Cx} =$$

$$\frac{\left(\frac{VBE}{2VREF} - 1\right)}{\left(\frac{VBE\_cali}{2VREF\_cali} - 1\right)}$$

Rx_cali, Cx_cali, VBE_cali and VREF_cali are constants measured in factory and burned in the chip 100. In the evaluated temperature data x, the non-ideal coefficient Rx·Cx are perfectly eliminated. The processor 112 may evaluate the temperature value T by the following calculation:

$$T = ax + b$$

where a and b may be constants, a is a slope value, and b is an offset value. From the high-accuracy temperature data x without non-ideal coefficients, the evaluated temperature value T is accurate. There may be a considerable vibration on the capacitor Cx within the switched-capacitor resistor 206 due to the aging effect or packaging stress. In the present invention, the non-ideal vibration on the capacitor Cx does not affect the accuracy of the thermal sensor 102.

In some exemplary embodiments, the direct-current voltages passed to the switched-capacitor integrator loop 206 are VDD and β·VDD. β is not limited to ½, may be any constant.

In another exemplary embodiment, the temperature-independent reference voltage VREF is not required. The disclosed dual-phase voltage-to-frequency converter is coupled to a bandgap circuit in the normal phase to perform a voltage-to-frequency conversion based on a temperature-dependent voltage generated by the bandgap circuit (without taking the temperature-independent reference voltage VREF into consideration). The disclosed dual-phase voltage-to-frequency converter is disconnected from the bandgap circuit in the coefficient capturing phase to perform the voltage-to-frequency conversion based on a single direct-current voltage derived from the supply voltage VDD.

Figure 3:
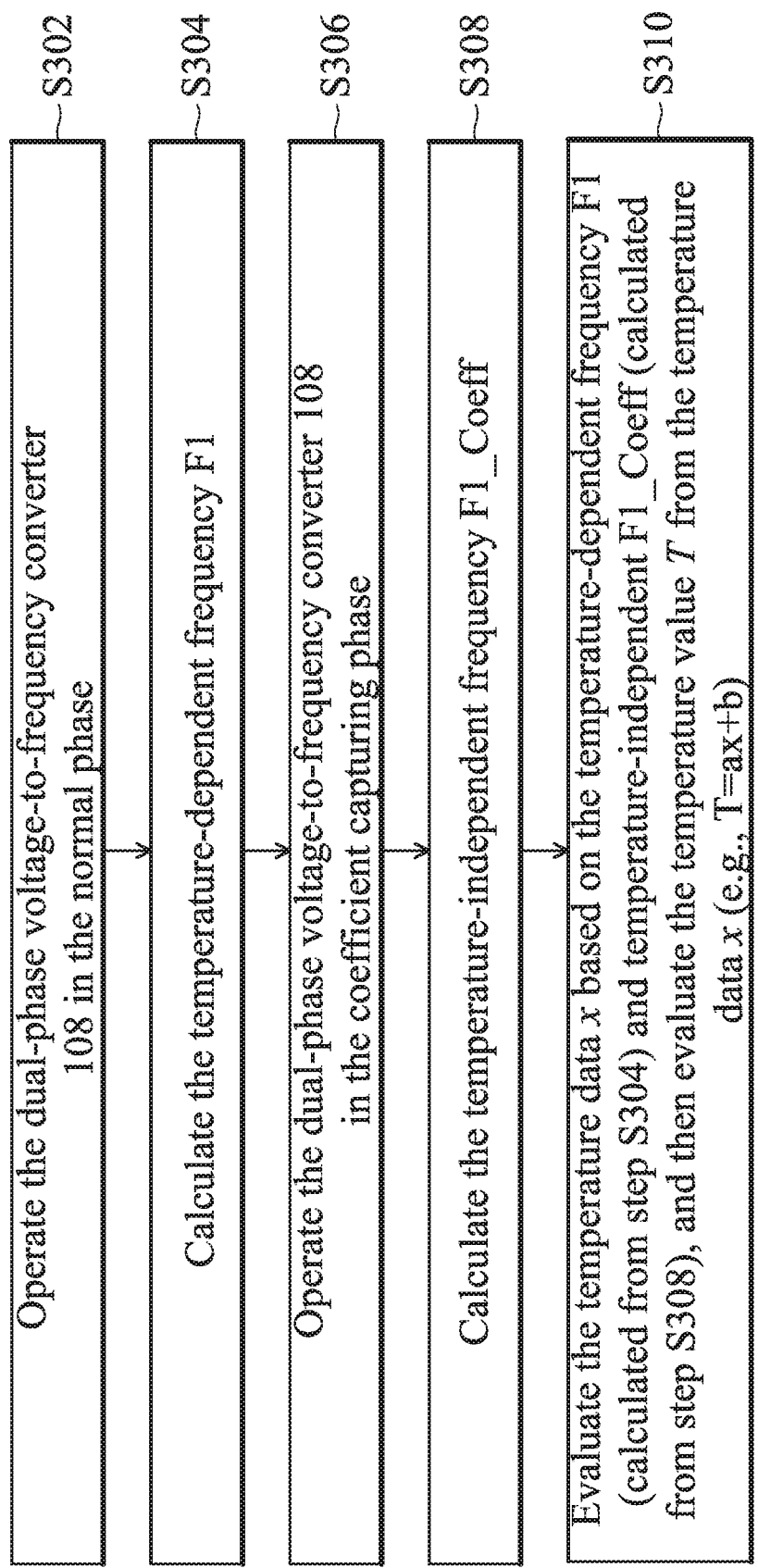
FIG. 3 is a flowchart depicting a thermal sensing procedure of the thermal sensor 102 in accordance with an exemplary embodiment of the present invention.

FIG. 3 is a flowchart depicting a thermal sensing procedure of the thermal sensor 102 in accordance with an exemplary embodiment of the present invention.

In step S302, the dual-phase voltage-to-frequency converter 108 is operated in the normal phase to perform voltage-to-frequency conversion based on the temperature-dependent voltage VBE/2 and the temperature-independent reference voltage VREF and thereby generate an oscillation signal Sosc oscillating at the temperature-dependent frequency F1.

In step S304, the frequency meter 110 calculates the temperature-dependent frequency F1.

In step S306, the dual-phase voltage-to-frequency converter 108 is operated in the coefficient capturing phase to perform voltage-to-frequency conversion based on two direct-current voltages VDD and VDD/2 and thereby the generated oscillation signal Sosc is switched to oscillate at the temperature-independent frequency F1_Coeff that includes the information about of the non-ideal coefficients.

In step S308, the frequency meter 110 calculates the temperature-independent frequency F1_Coeff.

In step S310, the processor 112 evaluates the temperature data x based on the temperature-dependent frequency F1 (calculated from step S304) and temperature-independent F1_Coeff (calculated from step S308), and then evaluates the temperature value T from the temperature data x (e.g., T=ax+b).

In some exemplary embodiments, the thermal sensor 102 may be manufactured as a module to be equipped into any electronic device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A thermal sensor, comprising:
   a bandgap circuit, outputting a temperature-dependent voltage;
   a dual-phase voltage-to-frequency converter, coupled to the bandgap circuit in a normal phase to perform a voltage-to-frequency conversion based on the temperature-dependent voltage, and disconnected from the bandgap circuit in a coefficient capturing phase to perform the voltage-to-frequency conversion based on a supply voltage; and
   a frequency meter, coupled to the dual-phase voltage-to-frequency converter to calculate a temperature-dependent frequency corresponding to the normal phase of the dual-phase voltage-to-frequency converter and a temperature-independent frequency corresponding to the coefficient capturing phase of the dual-phase voltage-to-frequency converter, wherein the temperature-dependent frequency and the temperature-independent frequency are provided for temperature evaluation with non-ideal coefficient elimination.

2. The thermal sensor as claimed in claim 1, further comprising:
a charge pump circuit, pumping the supply voltage to a higher level for operations of the bandgap circuit,
wherein the bandgap circuit further generates a temperature-independent reference voltage to be coupled to the dual-phase voltage-to-frequency converter with the temperature-dependent voltage.

3. The thermal sensor as claimed in claim 2, wherein:
the dual-phase voltage-to-frequency converter comprises a switched-capacitor integrator loop;
in the normal phase, the temperature-dependent voltage and the temperature-independent reference voltage are coupled to the switched-capacitor integrator loop and the switched-capacitor integrator loop generates an oscillation signal oscillating at the temperature-dependent frequency; and
in the coefficient capturing phase, a first direct-current voltage and a second direct-current voltage derived from the supply voltage are coupled to the switched-capacitor integrator loop and thereby the oscillation signal generated by the switched-capacitor integrator loop oscillates at the temperature-independent frequency.

4. The thermal sensor as claimed in claim 3, wherein the switched-capacitor integrator loop comprises:
an integrator;
a switched-capacitor resistor coupled to the integrator through an input terminal of the integrator, receiving the temperature-dependent voltage when the temperature-independent reference voltage is coupled to a reference terminal of the integrator, and receiving the first direct-current voltage when the second direct-current voltage is coupled to the reference terminal of the integrator;
a voltage controlled oscillator, generating the oscillation signal according to an output voltage of the integrator; and
a divider, operating the switched-capacitor resistor to mimic a resistor based on the oscillation signal.

5. The thermal sensor as claimed in claim 4, wherein the switched-capacitor resistor comprises:
a first switch and a second switch, controlled by an output signal and an inversed output signal of the divider, respectively; and
a capacitor, having a first terminal for receiving the temperature-dependent voltage or the first direct-current voltage and a second terminal coupled to the input terminal of the integrator through the second switch,
wherein the first switch is coupled between the first terminal and the second terminal of the capacitor.

6. The thermal sensor as claimed in claim 5, wherein:
the temperature-dependent frequency and the temperature-independent frequency both involve information about the capacitor of the switched-capacitor resistor that is affected by an aging effect or packaging stress; and
by combining the temperature-dependent frequency and the temperature-independent frequency, non-ideal coefficients due to the capacitor of the switched-capacitor resistor are eliminated and temperature data for evaluation of a temperature value is evaluated.

7. The thermal sensor as claimed in claim 6, wherein the dual-phase voltage-to-frequency converter further comprises:
a first selection circuit, coupling the temperature-dependent voltage to the first terminal of the capacitor of the switched-capacitor resistor in the normal phase and coupling the first direct-current voltage to the first terminal of the capacitor of the switched-capacitor resistor in the coefficient capturing phase; and
a second selection circuit, coupling the temperature-independent reference voltage to the reference terminal of the integrator in the normal phase and coupling the second direct-current voltage to the reference terminal of the integrator in the coefficient capturing phase.

8. The thermal sensor as claimed in claim 6, wherein the bandgap circuit comprises a bipolar junction transistor, and the temperature-dependent voltage is half of a voltage difference between a base and an emitter of the bipolar junction transistor.

9. The thermal sensor as claimed in claim 8, wherein:
the second direct-current voltage is half of the first direct-current voltage.

10. A chip, comprising:
a thermal sensor as claimed in claim 1; and
a processor, evaluating temperature data based on a temperature-dependent period derived from the temperature-dependent frequency and a temperature-independent period derived from the temperature-independent frequency, and evaluating a temperature value based on the temperature data,
wherein when evaluating the temperature data, the processor eliminates non-ideal coefficients of the temperature-dependent period by the temperature-independent period.

11. The chip as claimed in claim 10, wherein the thermal sensor further comprises:
a charge pump circuit, pumping the supply voltage to a higher level for operations of the bandgap circuit,
wherein the bandgap circuit further generates a temperature-independent reference voltage to be coupled to the dual-phase voltage-to-frequency converter with the temperature-dependent voltage.

12. The chip as claimed in claim 11, wherein:
the dual-phase voltage-to-frequency converter comprises a switched-capacitor integrator loop;
in the normal phase, the temperature-dependent voltage and the temperature-independent reference voltage are coupled to the switched-capacitor integrator loop and the switched-capacitor integrator loop generates an oscillation signal oscillating at the temperature-dependent frequency; and
in the coefficient capturing phase, a first direct-current voltage and a second direct-current voltage derived from the supply voltage are coupled to the switched-capacitor integrator loop and thereby the oscillation signal generated by the switched-capacitor integrator loop oscillates at the temperature-independent frequency.

13. The chip as claimed in claim 12, wherein the switched-capacitor integrator loop comprises:
an integrator;
a switched-capacitor resistor coupled to the integrator through an input terminal of the integrator, receiving the temperature-dependent voltage when the temperature-independent reference voltage is coupled to a reference terminal of the integrator, and receiving the first direct-current voltage when the second direct-current voltage is coupled to the reference terminal of the integrator;
a voltage controlled oscillator, generating the oscillation signal according to an output voltage of the integrator; and a divider, operating the switched-capacitor resistor to mimic a resistor based on the oscillation signal.

14. The chip as claimed in claim 13, wherein the switched-capacitor resistor comprises:
- a first switch and a second switch, controlled by an output signal and an inversed output signal of the divider, respectively; and
- a capacitor, having a first terminal for receiving the temperature-dependent voltage or the first direct-current voltage and a second terminal coupled to the input terminal of the integrator through the second switch,
- wherein the first switch is coupled between the first terminal and the second terminal of the capacitor.

15. The chip as claimed in claim 14, wherein:
- when evaluating the temperature data, the processor divides the temperature-dependent period by the temperature-independent period to eliminate the non-ideal coefficients which are contributed by the capacitor of the switched-capacitor resistor that is affected by the aging effect or packaging stress.

16. The chip as claimed in claim 15, wherein:
the processor evaluates the temperature value by performing the following calculation, $$T=ax+b,$$

where T is the temperature value, x is the temperature data, a is a slope value, and b is an offset value.

* * * * *